(No Model.) 3 Sheets—Sheet 3.
S. F. ENOS.
CHECK ROW CORN PLANTER.
No. 349,636. Patented Sept. 21, 1886.
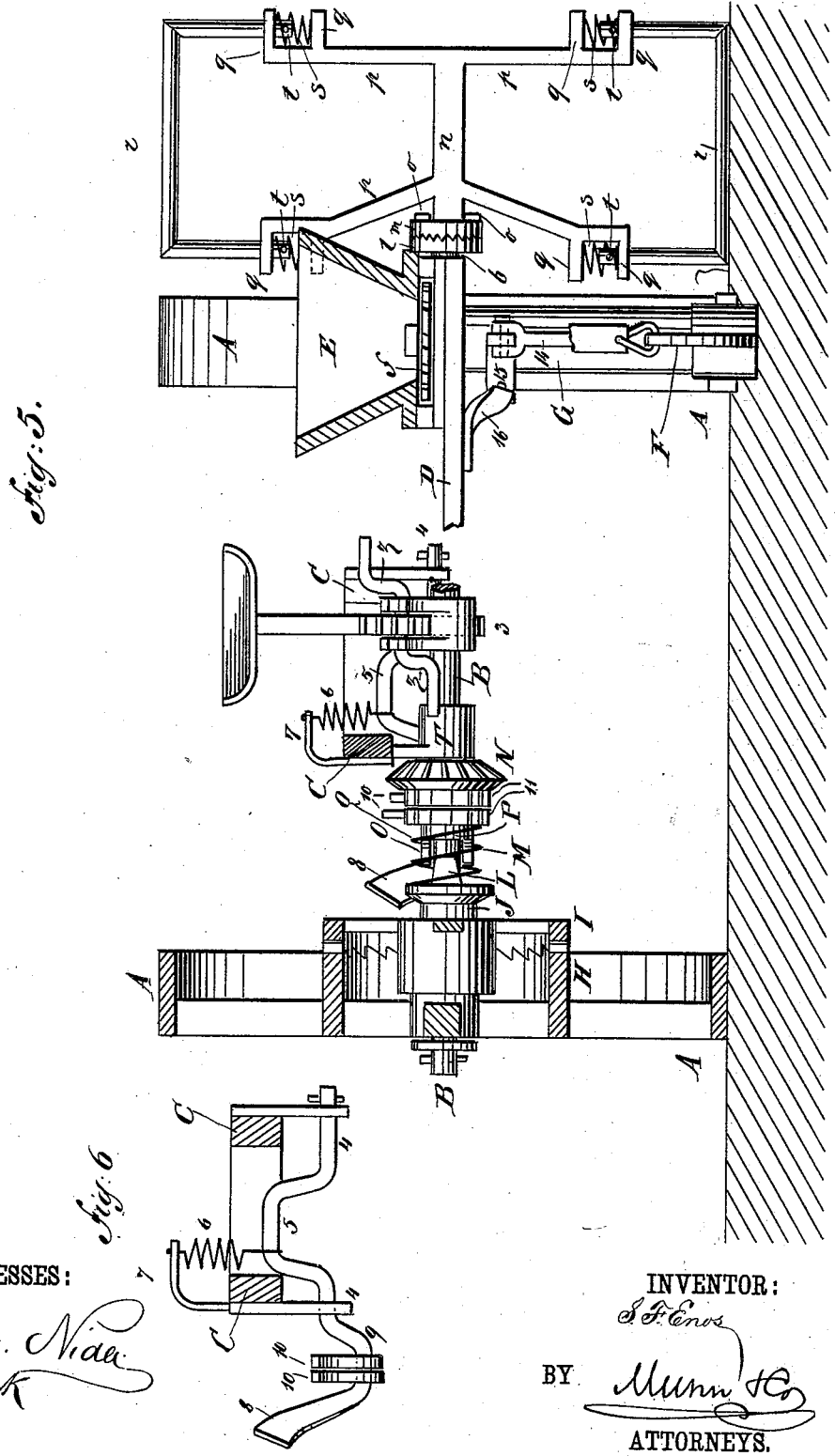
WITNESSES:
INVENTOR:
S. F. Enos
BY Munn & Co.
ATTORNEYS.

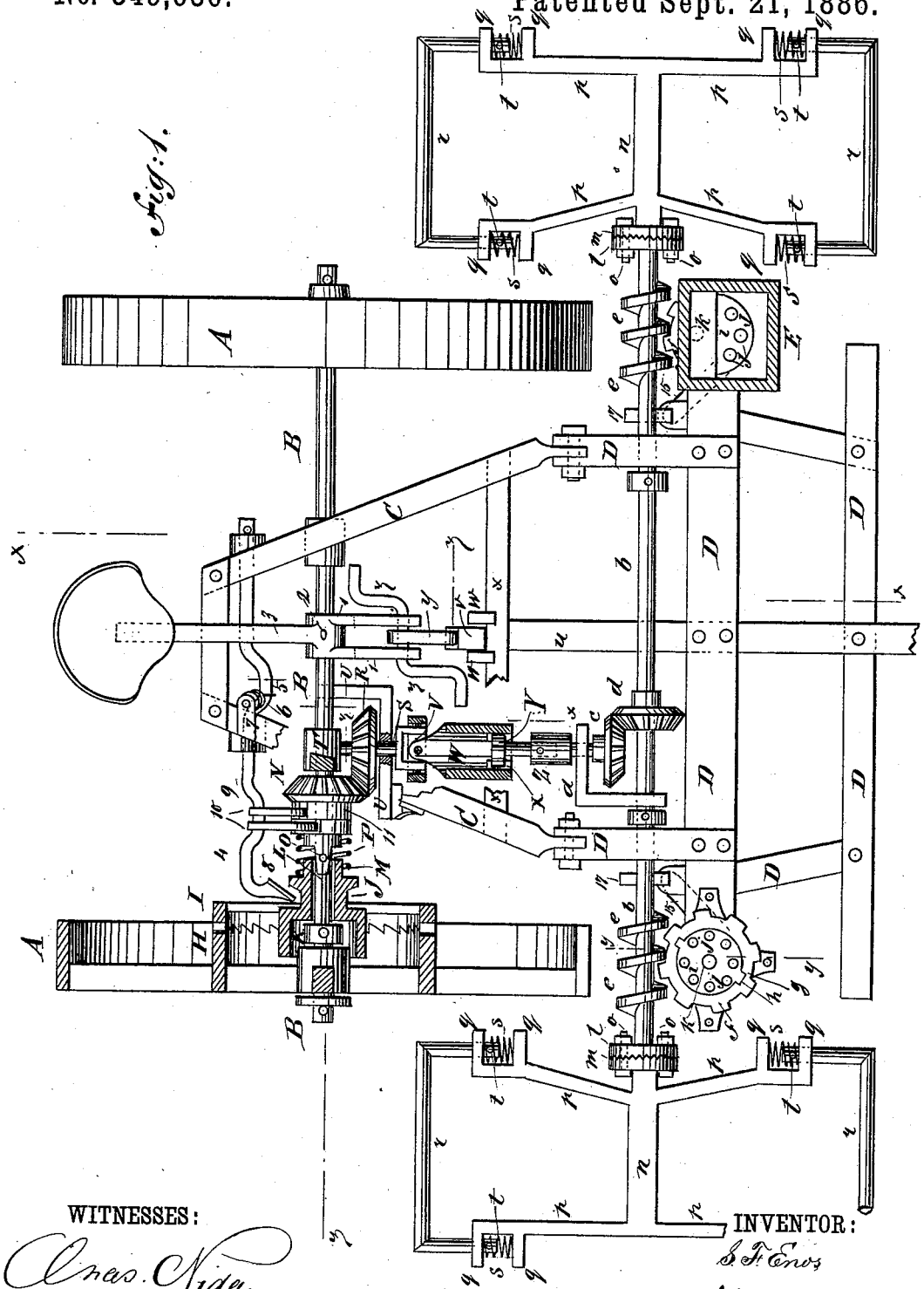

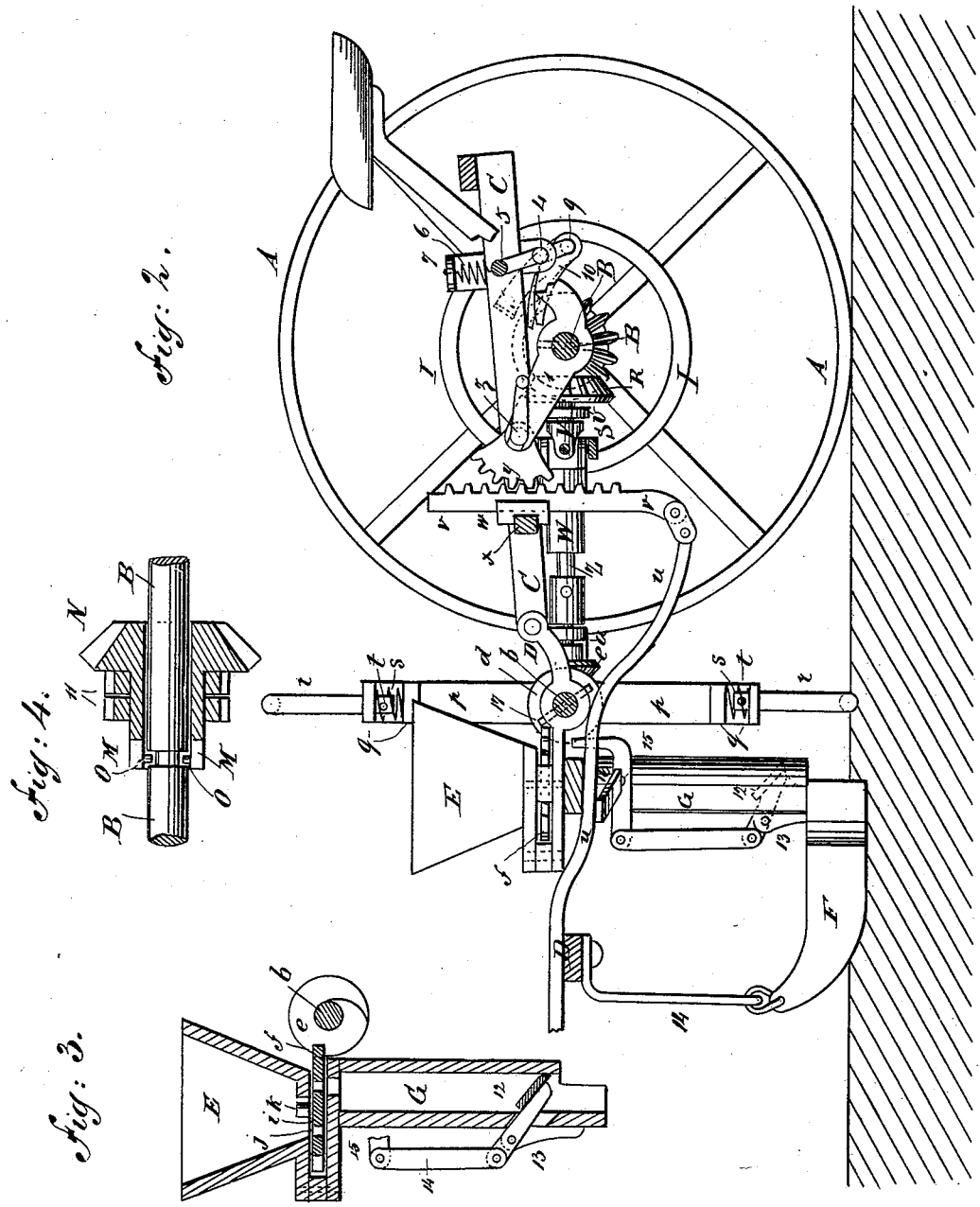

UNITED STATES PATENT OFFICE.

SILVANUS F. ENOS, OF ETNA, ILLINOIS.

CHECK-ROW CORN-PLANTER.

SPECIFICATION forming part of Letters Patent No. 349,636, dated September 21, 1886.

Application filed February 18, 1886. Serial No. 192,350. (No model.)

*To all whom it may concern:*

Be it known that I, SILVANUS FERDINAND ENOS, of Etna, in the county of Coles and State of Illinois, have invented a new and useful Improvement in Check-Row Corn-Planters, of which the following is a full, clear, and exact description.

Reference is to be had to the accompanying drawings, forming a part of this specification, in which similar letters of reference indicate corresponding parts in all the figures.

Figure 1 is a plan view of my improved check-row corn-planter, partly in section and parts being broken away. Fig. 2 is a sectional side elevation of the same, taken through the broken line *x x x x x*, Fig. 1. Fig. 3 is a sectional side elevation of a part of the same, taken through the line *y y*, Fig. 1. Fig. 4 is a sectional front elevation of the driving gear-wheel and its ratchet-wheels, a part of the axle being shown in side elevation. Fig. 5 is a front elevation of the machine, partly in section, through the line *z z z*, Fig. 1. Fig. 6 is a front elevation of the crank-shaft and pawls for retarding and hastening the drop, the frame being shown in section.

The object of this invention is to provide corn-planters constructed in such a manner that the seed will be dropped at uniform distances apart, that the lines of the cross-rows will be marked, that can be readily operated to retard or hasten the dropping of the seed, and that the dropping mechanism can be thrown out of gear by raising the forward part of the machine from the ground.

The invention consists in the construction and combination of various parts of the machine, as will be hereinafter fully described.

A represents the drive-wheels, to the axle B of which is attached the rear part of the frame C.

To the forward ends of the side bars of the frame C is hinged the forward frame, D, to which are secured the seed-boxes E and the runners F, to open channels to receive the seed. The rear standards, G, of the runners F are made tubular, to serve as spouts to conduct the seed to the ground.

To the spokes of one of the drive-wheels A is attached, or upon them is formed, a clutch-wheel, H, with the teeth of which engage the teeth of the clutch I. The hub of the clutch I slides and revolves upon the axle B, and around the inner end of the said hub is formed an annular groove, J, for a purpose hereinafter described. The outer part of the hub of the clutch I and its bore are enlarged to receive the collar K, secured to the axle B, to prevent the wheel A from sliding inward upon the said axle. Upon the inner end of the hub of the clutch I are formed long teeth, L, to engage with corresponding teeth, M, formed upon the hub of the beveled gear-wheel N, placed and revolving upon the axle B, and which is kept from moving laterally upon the said axle by pins or set-screws O, attached to the said hub, and which enter an annular groove, P, formed in the said axle, as shown in Fig. 4.

Upon the adjacent ends of the hubs of the clutch I and the beveled gear-wheel N is placed a spiral spring, Q, by the tension of which the said clutch is held in gear with the part H of the clutch attached to the wheel A. The teeth of the beveled gear-wheel N mesh into the teeth of the beveled gear-wheel R, attached to the short shaft S, which revolves in bearings T, attached to the axle B, and in a support, U, attached to the said axle and to the frame C. The forward end of the shaft S is connected by a universal joint, V, with the rear end of a short tube, W, which forms the middle part of the shaft.

In the inner surface of the forward end of the tube W are formed gear-teeth X, into which mesh the teeth of a small gear-wheel, Y, formed upon or attached to the rear end of the shaft Z. The forward part of the shaft Z revolves in a bracket, *a*, which rides upon the cross-shaft *b*.

To the forward end of the shaft Z is attached a beveled gear-wheel, *c*, the teeth of which mesh into the teeth of the beveled gear-wheel *d*, attached to the cross-shaft *b*. The cross-shaft *b* revolves in bearings in the forward frame, D, and is placed just in the rear of the seed-boxes E.

Upon the end parts of the shaft *b* are formed spiral threads *e*, which mesh into the teeth of annular disks *f*, in the inner edges of which are formed two or more recesses, *g*, to receive lugs *h*, formed upon the edges of the circular seed-dropping plates *i*. The seed-dropping plates *i* have circular rows of holes *j* formed through their outer parts, to receive the seed and convey it to the seed-conducting spouts G, through which it passes to the ground. Each hole $j$ is made of such a size as to contain the exact amount of seed to be dropped for a hill, and when more or less seed is to be dropped for a hill, or larger or smaller seed is to be dropped, the plates $i$ are replaced by other plates having larger or smaller seed-receiving holes.

In the centers of the plates $i$ are formed perforations to receive pivots $k$, attached to the frame D, or to plates secured to the said frame to support the seed-boxes E.

To the ends of the cross-shaft $b$ are attached disks $l$, the outer sides of which are toothed radially to engage with the toothed surfaces of the disks $m$, attached to the inner ends of the marker-shafts $n$. The disks $l m$ are perforated or slotted to receive the bolts $o$, by means of which the said disks are secured to each other. The marker-shafts $n$ can be formed solid with the cross-shaft $b$; but the construction first described is preferred, as it allows the markers to be readily adjusted to mark the ground exactly in line with the hills.

Upon the marker-shafts $n$ are formed, or to them are attached, arms $p$, which project upon the opposite sides of the said shafts, and upon the outer sides of the outer ends of which are formed pairs of lugs $q$, to receive the arms of the U-shaped marking-bars $r$, which pass through perforations in the outer lugs and enter recesses in the inner lugs, or abut against the said inner lugs. The marking-bars $r$ are held out by spiral springs $s$, placed on the arms of the said bars $r$, between the lugs $q$, with sufficient force to mark the soil under ordinary circumstances; but should the marking-bars $r$ strike an obstruction the springs $s$ will yield and allow the said marking-bars to move upward to prevent the markers from being broken. The marking-bars $r$ and the spiral springs $s$ are kept in place by pins $t$, passed through the said arms and between coils of the said springs between the lugs $q$, and the tension of the said springs $s$ can be regulated by adjusting the said pins $t$ from one to another of the coils of the springs $s$.

To the downwardly-inclined rear end of the bar $u$, attached to the forward frame, D, and which may be a rearward extension of the tongue, is hinged the lower end of a rack-bar, $v$. The rack-bar $v$ passes up between guide-lugs $w$, formed upon or attached to a cross-bar, $x$, the ends of which are secured to the side bars of the frame C. The rack-bar $v$ is arranged with its teeth to the rearward, and into the said teeth mesh the teeth of the gear-segment $y$, attached to a crank-shaft, $z$, journaled to the slotted forward end of the arm 1. The shaft $z$ has cranks upon both ends, which cranks project in opposite directions, as shown in Figs. 1 and 5, so that the driver, by operating the said crank-shaft with his feet, can raise and lower the forward frame, D, to take the runners F out of contact with the soil. As the forward frame, D, is raised the shaft $z$ slides back in the tube W, throwing the gear-wheel Y out of gear with the interior gear-teeth, X, and thus stopping the operation of the seed-dropping mechanism. As the frame D is again lowered the gear-wheel Y is brought into gear with the gear-teeth X, and the seed-dropping mechanism is again set in motion. The rear end of the arm 1 is perforated to receive the axle B, and is secured to the said axle by a pin, 2, which passes through holes in the said arm and through a hole in the said axle. The arm 1 is extended upwardly and rearwardly, and upon the upper end of this extension is secured the driver's seat.

To hangers or other bearings attached to the rear frame, C, is pivoted the shaft 4, which has a crank, 5, formed in it in such a position that it can be readily reached and operated by the driver with his foot. To the crank 5 is attached one end of a spiral spring, 6, the other end of which is secured to the frame C, or to a bracket, 7, attached to the said frame.

Upon the outer end of the shaft 4 is formed a pawl, 8, the engaging end of which is made slightly inclined, and which projects from the axis of the shaft in such a direction that when the crank 5 is turned down forward the said pawl will engage with the shoulder at the side of the annular groove J in the hub of the clutch I, and draw the said clutch inward out of gear with the part H of the clutch. By this construction the driver, by turning the crank 5 down forward with his foot, can withdraw the clutch I from the clutch H so far as to allow the said clutch H to gain one or more teeth, and thus retard the dropping of the seed, in case the cross-rows should be getting out of line by the seed dropping a little too soon. As the crank 5 in its forward and downward movement passes the vertical plane of the axis of the shaft 4 the spring 6 causes it to complete a revolution and brings it back to its former position.

Upon the shaft 4 is formed a crank, 9, to which are pivoted two pawls, 10, to engage with two ratchet-wheels, 11, formed upon or attached to the hub of the beveled gear-wheel N, the said crank 9 being so arranged that the pawls 10 will slide over the teeth of the said ratchet-wheels 11 when the crank-shaft 4 is turned forward to retard the dropping of the seed, but which, when the said crank-shaft 4 is turned to the rearward, will engage with the teeth of the said ratchet-wheels and push the gear-wheel N forward, so as to hasten the dropping of the seed. The shaft 4 can be turned back through nearly a half-revolution by the driver with his foot, and when released will be turned forward to its former position by the spring 6. The teeth of the two ratchet-wheels 11 alternate with each other to make the said ratchet-wheels more sensitive to the movement of the crank-shaft 4. With this construction the seed-dropping mechanism can be adjusted, without stopping the machine, to retard or hasten the dropping of the seed, so that the cross-rows can be kept in line. As the seed falls from the seed-dropping plate $i$ into the spout G it is received upon and detained by the valve 12, placed in the lower part of the said spout. The stem of the valve 12 passes out through a slot in the side of the spout, and is pivoted to lugs 13, formed upon or attached to the said spout.

To the outer end of the stem of the valve 12 is pivoted the lower end of a connecting-bar, 14, the upper end of which is pivoted to the end of a lever, 15. The lever 15 is pivoted to a support, 16, attached to the frame D, and its other end projects, so as to be struck successively by the projecting ends of a pin, 17, passing through and secured at its middle part to the cross-shaft $b$, so that the said valve will be operated to drop the seed to the ground by the revolution of the said shaft.

Having thus fully described my invention, I claim as new and desire to secure by Letters Patent—

1. In a check-row corn-planter, the combination, with the wheel A, the axle B, the hinged frames C D, and seed-boxes E, of the parts H I of the clutch, the pair of beveled gear-wheels N R, the shaft made in three parts and having its tubular middle part, W, connected with the rear end part, S, by a universal joint, V, and with the forward end part, Z, by interior gear-teeth, X, and a gear-wheel, Y, the pair of beveled gear-wheels $c\ d$, the cross-shaft $b$, having spiral flanges $e$, and the seed-dropping plates $f\ i$, substantially as herein shown and described, whereby the said seed-dropping plates will be operated to drop the seed by the advance of the machine, as set forth.

2. In a check-row corn-planter, the combination, with the cross-shaft $b$, that rotates the seed-dropping plates, and its driving mechanism, of the marker-shafts $n$, having upon their opposite sides projecting arms $p$, provided with lugs $q$ upon the outer sides of their outer ends, the U-shaped marking-bars connected with the said lugs, and the springs $s$ and the pins $t$, substantially as herein shown and described, whereby the ground will be marked in line with the cross-rows, and the marker-bars can yield should they strike an obstruction, as set forth.

3. In a check-row corn-planter, the combination, with the frame C and the clutch I, having an annular groove in its hub, of the shaft 4, having crank 5 and pawl 8, and the spring 6, substantially as herein shown and described, whereby the seed-dropping mechanism can be regulated to retard the seed-dropping and straighten the cross-rows, as set forth.

4. In a check-row corn-planter, the combination, with the frame C, the gear-wheel N, and the axle B, of the shaft 4, having cranks 5 and 9, the pawls 10, pivoted to the crank 9, and the ratchet-wheels 11, secured to the said gear-wheel, substantially as herein shown and described, whereby the seed-dropping mechanism can be regulated to hasten the seed-dropping and straighten the cross-rows, as set forth.

SILVANUS F. ENOS.

Witnesses:
R. A. TRAVER,
T. W. GAW.